(No Model.)

C. S. BRADLEY.
CONVERTING SIMPLE INTO POLYPHASE ALTERNATING CURRENTS.

No. 551,809.  Patented Dec. 24, 1895.

Attest:
O. W. Benjamin.
E. C. Grigg.

Inventor:
Charles S. Bradley
by Rutto Price
his attys.

UNITED STATES PATENT OFFICE.

CHARLES S. BRADLEY, OF AVON, NEW YORK.

CONVERTING SIMPLE INTO POLYPHASE ALTERNATING CURRENTS.

SPECIFICATION forming part of Letters Patent No. 551,809, dated December 24, 1895.

Application filed June 11, 1892. Serial No. 436,405. (No model.)

*To all whom it may concern:*

Be it known that I, CHARLES S. BRADLEY, a citizen of the United States, residing at Avon, in the county of Livingston and State of New York, have invented certain new and useful Improvements in Converting Simple into Polyphase Alternating Currents; and I do hereby declare the following to be a full, clear, and exact description of the invention, such as will enable others skilled in the art to which it appertains to make and use the same.

In systems of electric distribution by alternating currents, and especially in the transmission of power, it is desirable to use a single pair of conducting-mains. By reason of the great self-induction of alternating-current motors operating with a current of single phase it has not been found practicable heretofore to use a single pair of mains. If, however, a number of alternating currents differing in phase can be developed from a simple alternating current electromotors can be operated efficiently therefrom.

In an application filed by me, Serial No. 425,334, dated March 17, 1892, I described a system for developing polyphase currents from a single alternating circuit by means of a rotary magnetic field, said rotary field being produced by two or more currents derived from the simple alternating current and reacting upon a secondary consumption circuit.

In the invention herein described I produce polyphase currents from a simple alternating current without the intermediation of a rotary magnetic field.

The several features of novelty will be hereinafter fully described, and definitely indicated in the claims appended to this specification.

Figure 1:
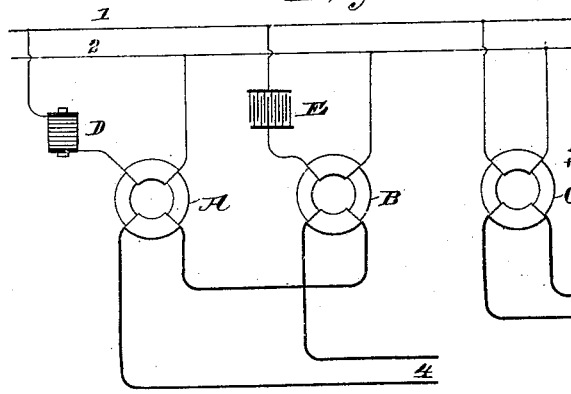
Figure 2:
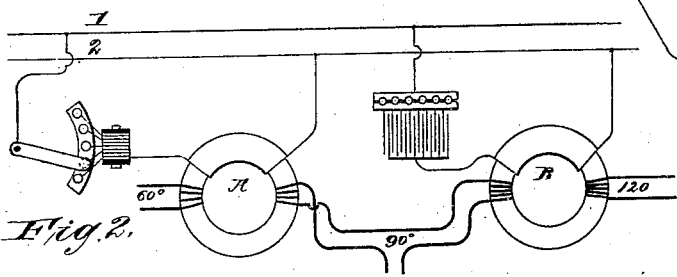
Figure 3:
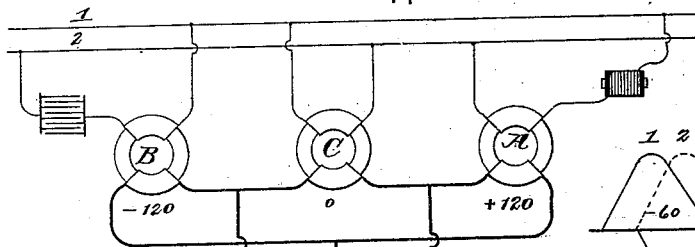
Figure 6:
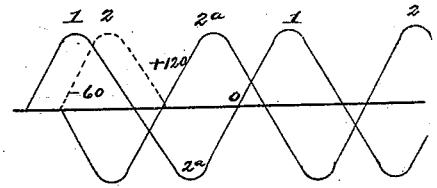
Figure 7:
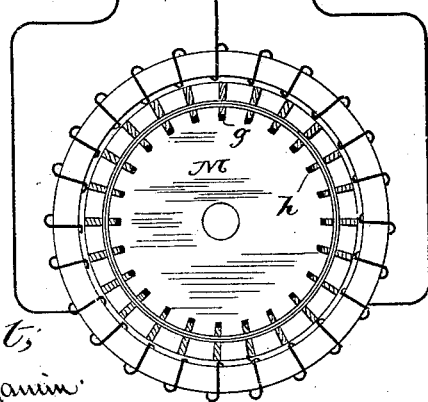

In the accompanying drawings, which illustrate the invention, Figure 1 illustrates diagrammatically a system for developing two quarter-phase currents. Fig. 2 illustrates a system in which any desired number of polyphase currents may be developed. Fig. 3 illustrates a rotary current-motor operated from a simple alternating circuit. Figs. 4, 5, 6, and 7 are diagrams illustrating the method of phasing by which a desired amount of phasial difference may be produced from a simple alternating current to render the currents suitable for use in developing power.

Figure 4:
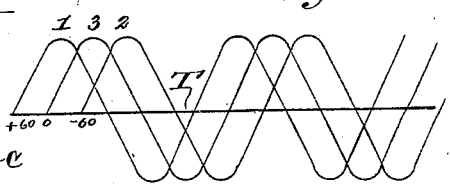
Figure 5:
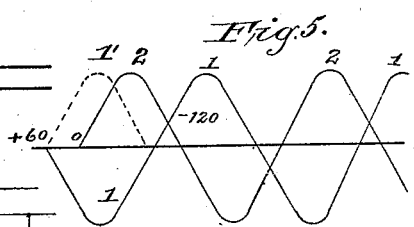

Referring to the drawings, 1 and 2 represent a pair of mains in a simple alternating-current circuit. A, B, and C represent three transformers, the primary circuits of which are supplied by the mains 1 and 2. If these circuits were fed directly from the alternating circuit the phases in their secondary circuits would coincide; but if a reaction device, such as an electromagnet or its equivalent, be interposed in one of the circuits, as indicated at D, the time of current flow in such circuit will lag behind the corresponding phase of electromotive force impressed by the alternating-current mains, and the amount of this lag may be varied by varying the number of coils of the reactive device in circuit. A condenser has the property of giving a lead in phase to the current so that the latter will anticipate the phase or the impressed electromotive force. If, therefore, a condenser E be used in the circuit of the transformer B current delivered by such transformer will lead the line-current. The reaction device and condenser may be easily adjusted so as to give a lead and lag of sixty degrees. We thus have at hand means for developing polyphase currents which may, as in Fig. 3, be carried directly to a motor-circuit or may be combined in various groups, so as to change the number of currents delivered or the amount of phasial difference. In Fig. 1, for example, the phase of current delivered by the secondary of the transformer B will be sixty degrees in advance of the current delivered by transformer C and that of A will be sixty degrees behind. By various combinations of the several secondary circuits the amount of lead or lag may be varied at will. For example, if the secondary circuits of A and B of Fig. 1 be grouped together, the same number of coils being active in both circuits, there may be produced in the circuit 4 a current having a difference of phase of ninety degrees from that developed in circuit 3, or by another system of connections the phase of the current in 4 may be made to coincide in point of time with that in 3. This will be understood upon an examination of Figs. 4 and 5. In Fig. 4, for instance, suppose the sinusoidal curve 3 to represent the wave developed in circuit 3, then as the current delivered by transformer B is sixty degrees in advance of this current the curve 1 will represent the current delivered by B, and as the current delivered by A has a lag of sixty degrees behind the current delivered by C the curve 2 will represent the position of its wave with reference to the time-line T. It will be evident from an inspection of this figure that if the waves 1 and 2 be thrown upon the same wire with similar terminals in similar directions with relation to the wire the resultant current would coincide in time with the wave 3, but would of course be greater in electromotive force by reason of the two electromotive forces acting in conjunction. Suppose the terminals of the circuit controlled by the condenser be reversed. Then if the curve 2, Fig. 5, represents the wave of current delivered by transformer C the dotted curve 1', which is sixty degrees in advance of the curve 2, would represent the current delivered by the transformer B, including the condenser; but inasmuch as the terminals of this circuit are reversed the wave of current indicated by the curve 1' will lie below the zero-line, as shown at 1, and the condenser-circuit will therefore deliver its phases at a time indicated by the curve 1. An examination of this curve will show that the reversal of the terminals results in producing a lag of one hundred and eighty minus sixty, or one hundred and twenty degrees behind the current delivered by C. Similarly if the terminals of the circuit including the reaction-coil be reversed an examination of Fig. 6 will demonstrate that the lag of sixty degrees in this circuit will be converted into a lead of one hundred and twenty degrees. Thus we have at hand the means of producing three waves of electromotive force at the secondary terminals of the three transformers differing in phase by one hundred and twenty degrees and these may be joined into a closed circuit, as indicated in Fig. 3, and adapted to supply a rotary current-motor operating on the tri-phase principle, as will be more fully hereinafter described.

The reversal of terminals to accomplish the results just described might be made either in a primary or secondary circuit. As shown in Fig. 1, the secondary terminals have been reversed. As shown in Fig. 3, the reversal is made in the primary circuit. An examination of Fig. 7 will indicate how the combination of the secondary circuits A and B (shown in Fig. 1) will develop a difference of phase of ninety degrees. In this case the terminals of the circuit controlled by the condenser are reversed, thus converting the lead of sixty degrees given by the condenser into a lag of one hundred and twenty degrees, as indicated by the sinusoidal curve 1, Fig. 7; but the current controlled by the reaction coil lags sixty degrees, as indicated by the sinusoidal curve 2. The resultant electromotive force due to the combined action of these two phases delivered in the same circuit 4, Fig. 1, will be indicated by the curve 4, Fig. 7, and will lie midway between the curves 1 and 2 or ninety degrees distant from the curve 3. The amount of lag or lead may be varied by varying the number of active coils in the several circuits. By shifting the terminals or varying the number of convolutions we thus have at hand the means of producing any desired number of differences in phase. For example, as indicated in Fig. 2, a current taken directly from the transformer A would have a lag of sixty degrees with reference to the time period of a current delivered by a simple transformer connected with the same supply-circuit; but by a reversal of the terminals this lag of sixty degrees might be converted into a lead of one hundred and twenty degrees. Similarly the transformer B would give a lead of sixty or a lag of one hundred and twenty degrees, and by combinations of the two currents four intermediate degrees of lead or lag may be derived. It will thus be seen that we have at hand a simple means of developing from a simple alternating current a tri-phase alternating current having a phasial difference of one hundred and twenty degrees. For example, as indicated in Fig. 3, if the transformers A and B, including, respectively, in their primary circuits a reaction coil and a condenser, have their terminals connected to the mains 1 and 2 reversely with respect to the transformer C the electromotive forces delivered at the terminals of the three secondary circuits will differ in phase by one hundred and twenty degrees, and by connecting these secondary terminals in a closed circuit, as indicated, and leading three wires $d\ e\ f$ to a rotary current-motor M such motor may be efficiently operated. This motor may be provided with a closed coil-winding on a stationary ring-core, to three equidistant points of which the leads $d\ e\ f$ are connected, and be provided with a laminated rotating element provided with a closed coil-winding. In the form illustrated the rotating element is provided with a series of peripheral grooves in which are laid conductors $g$, all electrically connected at the ends by a conducting-ring $h$. The motor, however, forms no part of the present invention and is simply shown by way of illustration.

The mode of changing the phase relation of an alternating current with reference to another current or currents when the phases have an oblique-angled relation by inverting or reversely applying its phases is easily distinguished from a case in which the currents have a right-angled relation—that is to say, having a phase difference of ninety degrees—since in the latter case the effective difference of phase is not altered, the reversal merely converting a lead of ninety degrees into a lag of the same amount or vice versa, the angular separation remaining the same. With oblique-angled phases, however—that is to say, where the angular phase-displacement is acute or obtuse—a reversal changes the angular separation, and very different results become possible. For example, the distance between two currents sixty degrees apart may be amplified to one hundred and twenty degrees, and whereas the two former would *per se* be incapable of operating polyphase motors, the latter are highly efficient in developing such operation.

Having thus described my invention, what I claim as new, and desire to secure by Letters Patent, is—

1. The method of changing the phase difference of alternating currents consisting in establishing electromotive forces whose phases differ by an oblique angle and bringing said electromotive forces into inductive cooperation with relatively reversed phases.

2. Means for changing the phase difference of alternating currents comprising a source of two electromotive forces differing in phase by an oblique angle, and inductively cooperating coils having their terminals reversely connected with respect to said electromotive forces.

3. Means for producing two cooperating alternating currents of predetermined phase-difference comprising a supply circuit, a circuit supplied by the latter through a phase changing device, a translating device, a companion supplied circuit, and connections for relatively reversing the associated phases in the translating device.

4. The combination with a simple alternating current circuit, of two or more branches containing respectively a condenser and reaction coil, and a work circuit in fixed inductive relation to both branches, and connections combining the two displaced electromotive forces in the same work-circuit to produce a predetermined resultant phase therein.

5. The combination with a simple alternating current circuit, of a plurality of transformers supplied thereby, means for creating a difference of phase in the several transformers, and interconnections for combining the displaced phases to produce a resultant phase or phases.

6. The combination of a simple alternating current circuit, a plurality of transformers supplied thereby through phase advancing and retarding devices, and a plurality of coils in inductive relation to the several phases, said coils being connected in series relation.

In testimony whereof I affix my signature in presence of two witnesses.

CHARLES S. BRADLEY.

Witnesses:
 OCTAVIA STEWART,
 H. J. MILLER.